Aug. 23, 1927. W. H. EVANS Re. 16,719

FLEXIBLE VENTILATING HOSE

Original Filed Aug. 9, 1924

Inventor

W. H. Evans

By R. S. Smith

Attorney

Reissued Aug. 23, 1927. Re. 16,719

UNITED STATES PATENT OFFICE.

WILLIAM HOOPER EVANS, OF BRIDGEPORT, CONNECTICUT.

FLEXIBLE VENTILATING HOSE.

Original No. 1,596,418, dated August 17, 1926, Serial No. 731,183, filed August 9, 1924. Application for reissue filed February 8, 1927. Serial No. 166,797.

My invention relates to a flexible fabric ventilating hose such as is in general use in mines and the like for conveying air under relatively low pressure into the workings.

Pipe of the character in question has heretofore been generally manufactured of canvas which is a fabric woven from cotton and in some instances has been made up from fabric woven from wool. Such fabrics after being suitably water-proofed to render them air tight are cut into long strips which have their longitudinal edges stitched together to form a hose section. Grommets are usually mounted in the side seam for the reception of the suspension wire, cable or the like which is usually employed for suspending the hose in the mine workings where it will be out of the way and least liable to injury.

Obviously hose for the purposes in question is used under conditions which expose it constantly to moisture, and experience has shown that the fabrics heretofore used in the manufacture of the hose will be attacked with mildew, fungus, or like disease resulting from long subjection to moisture, or acid water and will rapidly deteriorate. So serious is this problem that under normal conditions of the mine usage piping though well water-proofed will not in many instances last more than six weeks.

I have further observed, after long practical experience with air hose of the character in question, that the strain of suspension of the pipe either horizontally or vertically results very shortly in a tearing or breaking of the seam when the pipe is handled and this is particularly true in the case of hose suspended vertically where the upper sections must carry the load of the lower sections which hang therefrom.

The object of my present invention is to provide an air hose of the character in question which shall possess the maximum durability and strength without being materially increased in cost, and such object is attained; first, by weaving the fabric from which the hose is formed of animal hair which will be substantially proof against mildew or fungus attack under conditions of moisture, the best hair for this purpose which I have found being a mixture of camel and llama hair, which will, after treatment to render it moisture-proof, last indefinitely; and second, by taking care of the main stresses and strains on the seam of the hose, and sustaining the suspension load thereof, by a reinforcing element which extends the length of the hose section and may be suitably anchored at its ends.

My invention in its preferred embodiment will be better understood by reference to the accompanying drawings, which form a part of this specification, and in which:—

Similar reference numerals refer to similar parts throughout the drawings.

Figure 1:
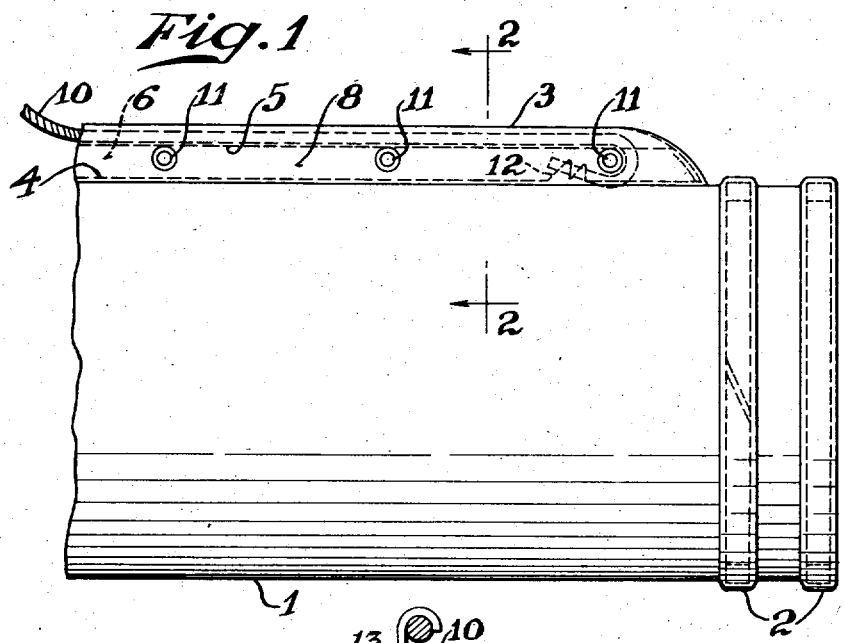
Fig. 1 shows part of a section of hose equipped with the reinforcement according to my invention.
Figure 2:
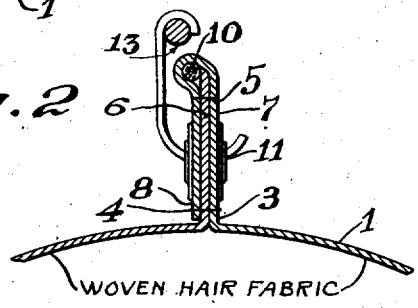
Fig. 2 is a vertical cross-section on the line 2—2 of Fig. 1.
Figure 3:
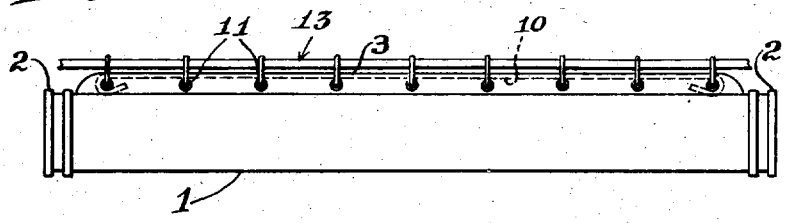
Fig. 3 is a small sized view of a complete hose section.

I illustrate a hose section 1 having suitable joint forming ends 2 which can be of any desired character and provided, intermediate said joints, with a side seam 3 having the two seam members 6 and 7 and an extension edge 8 on the seam member 7 which is folded back down against the member 6 and bound to the other two seam members by the stitching 4 and 5. I place in the loop formed at the outer ends of the members 7 and 8 a rope, cable or other reinforcing and suspension element 10 and through the seam members 6, 7 and 8 between the seams 4 and 5 I pass grommets 11, the cable being anchored at both ends by being passed around the end grommets and bound in at its free end by stitching 12, or secured to the hose or its seam in any other suitable manner which will hold it firmly so that it will resist the stresses and suspension strains which may fall on the seam or hose from the suspension device conventionally indicated at 13 in Figs. 2 and 3. By thus incorporating the reinforcement in the seam or otherwise securing it to the hose lengthwise of the seam it is in position to reinforce the grommets, and to distribute the suspension load of the hose section along the reinforcement, and it makes it unnecessary to pass the stitching 4 about the grommets which is the present practice and which involves added expense in manufacture.

The fabric from which the hose is formed is woven of animal hair, preferably camel hair or a mixture of camel and llama hair, which is subsequently water-proofed. I have discovered that fabric woven of such hair not only possesses great strength, which is already well known from the use of camel hair for belting and the like, but has the added property of being highly resistant to fungus attack when subjected for long periods to dampness, acid water, and moisture and this property is more valuable for the purposes which I have in mind than the mere element of strength in the fabric itself.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. An air hose constructed of flexible fabric, sewn to form a longitudinal butt-joint, and having flexible joint-reinforcing means extending along said joint and secured to the hose, and suspension means cooperating with the butt joint and reinforcing means, whereby said reinforcing means receives the weight of the hose.

2. An air hose as claimed in claim 1, in which said suspension means comprises a series of grommets placed in the butt-joint, between the reinforcing means and the outer periphery of the hose.

3. An air hose constructed of flexible fabric, having a butt-joint extending longitudinally thereof, and flexible reinforcing means sewn into said joint, and suspension means cooperating with the butt joint and reinforcing means whereby said reinforcing means sustains the weight of the hose.

4. An air hose constructed of flexible fabric having a pair of members forming a butt-joint extending longitudinally thereof with one of the members of said joint carried outwardly beyond the other member, turned back upon itself to form a loop, and secured to said other member; and flexible reinforcing means engaged by said loop throughout substantially its length, whereby the weight of the hose is distributed along said reinforcing member.

5. An air hose for ventilating mines and the like, formed of flexible fabric sewn at a longitudinal butt-joint into tubular form, and having a longitudinal flexible reinforcing element extending substantially the length of said joint and secured to the hose at its ends and grommets mounted near the ends of said joint, the free ends of the reinforcing element being passed around said end grommets and secured against displacement.

6. An air hose constructed of flexible fabric sewn longitudinally to provide a joint, a flexible reinforcing means extending along and secured to said joint, and suspension means co-acting with the joint and its reinforcing means whereby the weight of the hose is transmitted to and distributed along said reinforcing means.

7. An air hose constructed of flexible fabric having a longitudinal seam, in combination with flexible reinforcing means extending along said seam and secured to the hose, and suspension means adapted to co-act with the seam between the hose and its reinforcing means to transmit to and distribute along the latter the strain of supporting the weight of the hose.

8. An air hose constructed of flexible fabric sewn to provide a longitudinal outstanding loop, and flexible reinforcing means extending longitudinally of and incorporated in said loop, in combination with a plurality of suspension means cooperating at intervals with the loop and its reinforcing means whereby the weight of the hose is transmitted to and distributed along the said reinforcing means.

9. The combination with a flexible fabric hose adapted for suspension, of a reinforcing member extending longitudinally along and secured throughout its length to the hose, and a plurality of suspension elements disposed between the hose and the member for transmitting and distributing the weight of the hose to said member.

10. In a flexible fabric hose adapted for suspension, means providing an outwardly extending seam, a flexible reinforcing member incorporated in the seam, and suspension elements co-acting with the seam to transmit to and distribute along the reinforcing member, the weight of the hose when suspended.

11. In a flexible fabric hose adapted for suspension, a longitudinal joint, a flexible reinforcing member incorporated in the joint, and suspension elements co-acting with the reinforcing member between said member and the hose, for transmitting and distributing the weight of the hose to the reinforcing member when the hose is suspended.

12. In a flexible fabric hose adapted for suspension, a longitudinal joint formed by sewing the edges of the material together to provide an outwardly extending loop, a flexible reinforcing member sewed into the loop substantially the entire length of the hose, and a series of grommets provided in the material between the reinforcing member and the hose and so positioned as to transmit and distribute the weight of the hose to the reinforcing member when suspended.

In testimony whereof I affix my signature.

WILLIAM HOOPER EVANS.